(12) United States Patent
Senatori et al.

(10) Patent No.: US 8,405,965 B2
(45) Date of Patent: Mar. 26, 2013

(54) ROTATIONALLY CONTROLLED OFFSET CABLE ROUTING THROUGH HINGE PIVOTS

(75) Inventors: Mark D. Senatori, The Woodlands, TX (US); Brittany Davis, Houston, TX (US); Paul J. Doczy, Cypress, TX (US); Kevin L. Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 204 days.

(21) Appl. No.: 13/003,545

(22) PCT Filed: Jul. 16, 2008

(86) PCT No.: PCT/US2008/070128
§ 371 (c)(1),
(2), (4) Date: Jan. 10, 2011

(87) PCT Pub. No.: WO2010/008384
PCT Pub. Date: Jan. 21, 2010

(65) Prior Publication Data
US 2011/0116222 A1    May 19, 2011

(51) Int. Cl.
*G06F 1/16* (2006.01)
(52) U.S. Cl. ......... 361/679.28; 361/679.21; 361/679.26; 361/679.27; 248/917; 248/918
(58) Field of Classification Search ............ 361/679.28
See application file for complete search history.

(56) References Cited

U.S. PATENT DOCUMENTS

| | | | |
|---|---|---|---|
| 4,877,973 A | 10/1989 | Torii et al. | |
| 4,959,887 A * | 10/1990 | Gruenberg et al. | 16/223 |
| 5,394,297 A * | 2/1995 | Toedter | 361/679.28 |
| 5,751,544 A | 5/1998 | Song | |
| 5,796,576 A * | 8/1998 | Kim | 361/679.28 |
| 6,873,520 B2 | 3/2005 | Takagi et al. | |
| 6,882,726 B2 * | 4/2005 | Kim | 379/433.13 |
| 7,787,242 B2 * | 8/2010 | Schwager et al. | 361/679.28 |
| 7,791,876 B2 * | 9/2010 | Moore et al. | 361/679.53 |
| 7,848,094 B2 * | 12/2010 | Wang et al. | 361/679.28 |
| 2004/0002241 A1 * | 1/2004 | Lee | 439/165 |
| 2008/0094792 A1 | 4/2008 | Chen | |

FOREIGN PATENT DOCUMENTS

| | | |
|---|---|---|
| CN | 1404284 A | 3/2003 |
| JP | 2000151140 | 5/2000 |
| KR | 10-1999-0031994 | 5/1999 |

OTHER PUBLICATIONS

The International Search Report and the Written Opinion of the International Searching Authority for International Application No. PCT/US2008/070128 dated Mar. 26, 2009, pp. 11.
Intellectual Property Office, Examination Report under Section 18(3), Appln No. 1019280.5, date of mailing Feb. 29, 2012, 5 p.
Intellectual Property Office, Examination Report under Section 18(3), Appln No. 1019280.5, mailed Oct. 24, 2012, pp. 3.

* cited by examiner

*Primary Examiner* — Anthony Q Edwards

(57) ABSTRACT

A system comprises a cable, a hinge, and a cable guide. The hinge comprises a longitudinal axis of the hinge. A cable guide is adapted to route the cable through the hinge offset from the longitudinal axis of the hinge.

9 Claims, 2 Drawing Sheets

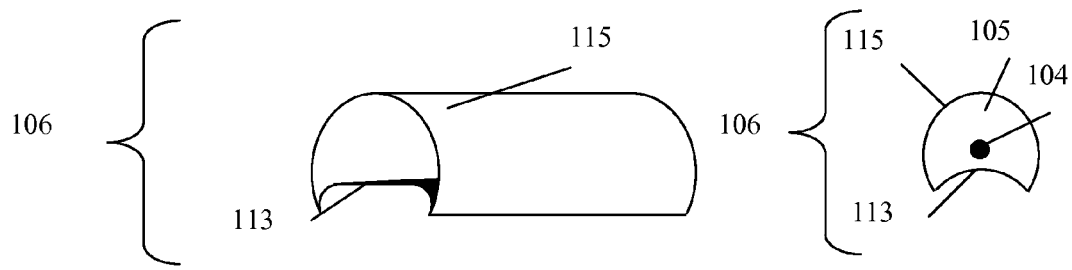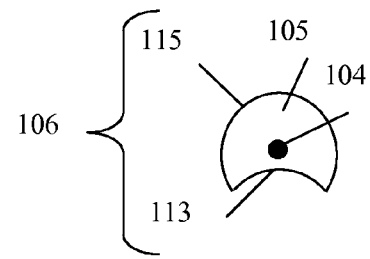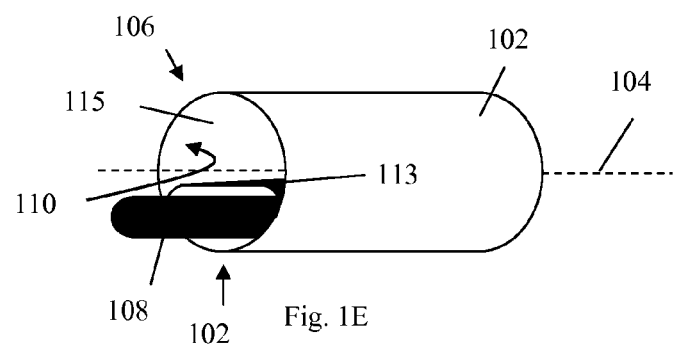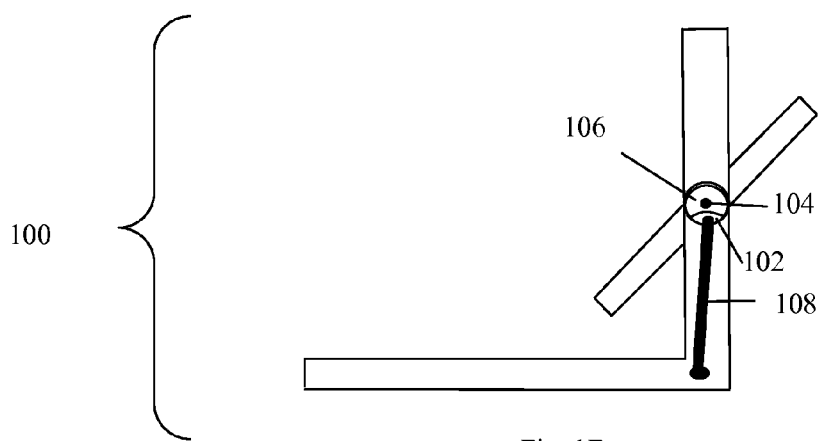

ROTATIONALLY CONTROLLED OFFSET CABLE ROUTING THROUGH HINGE PIVOTS

BACKGROUND

Laptop computers comprise a display portion coupled to a housing portion. Electrical connectors, wires, and cables route power and information throughout laptop computers, including to the display portion. As such, efficient manners of routing the electrical connectors, wires, and cables are desirable.

BRIEF DESCRIPTION OF THE DRAWINGS

For a detailed description of exemplary embodiments of the invention, reference will now be made to the accompanying drawings in which:

FIGS. 1A-1F illustrate a system implementing offset cable routing in accordance with at least one exemplary embodiment.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . "

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Offset cable routing is disclosed. In at least one embodiment, offset cable routing is implemented in laptop computers wherein a display portion of the laptop computer is coupled to a housing portion of the laptop computer via a hinge. The hinge is adapted to rotate the display vertically about a horizontal longitudinal axis of the hinge. Considering a cross section of the cylindrical member of a hinge, a circle, the longitudinal axis of the hinge is a line running through the center of the circle parallel to the cylindrical member. In at least one embodiment, a cable conducts power and display information to the display portion. A cable that is routed along the longitudinal axis requires extra space surrounding the cable to be allotted in the hinge to allow for movement of the cable as the hinge rotates. If the extra space is not allotted, cable movement will be restricted causing the cable to restrict hinge movement. As a result, the hinge will not rotate fully in some cases or the cable will be subject to excessive wear.

Offset cable routing is accomplished by guiding a cable through a cable guide within the hinge such that the cable does not occupy the space along the longitudinal axis. Preferably, the cable is physically restricted by the cable guide from occupying the space corresponding to any point along the longitudinal axis. Thus, as the hinge is rotated about the longitudinal axis, the cable maintains a certain minimum distance from the longitudinal axis. Offset cable routing is preferably utilized where the space available in the hinge is limited. As a result, the hinge may accommodate additional objects, may be made smaller (allowing other components, such as the display portion, to be larger), or may simply gain additional space.

Figure 1A:
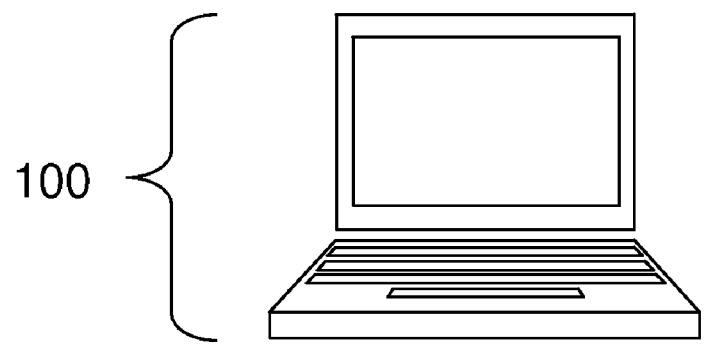
Figure 1B:
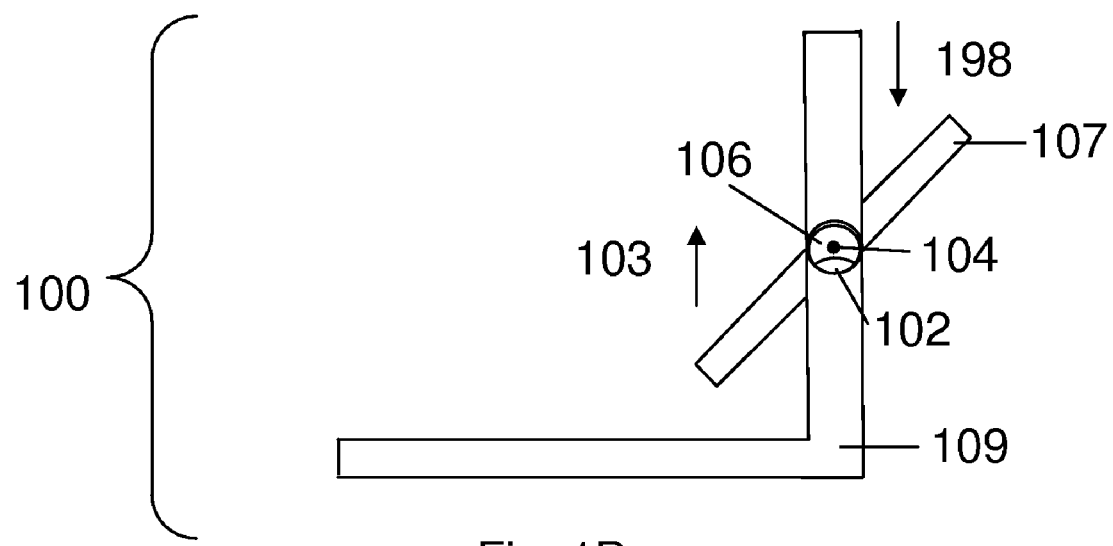

FIGS. 1A-1F illustrate a system 100 implementing offset cable routing in accordance with at least one embodiment. Referring to FIG. 1A, the system 100 is illustrated. In at least one embodiment, the system 100 comprises a computer, preferably a laptop computer. Referring to FIG. 1B, a cross-section side view of the computer is illustrated. Specifically, a cross section of a computer that exposes the hinge 102 is illustrated. The computer preferably comprises a display portion 107, a housing portion 109, and a hinge 102. The hinge comprises a longitudinal axis 104, a line traveling through the center of the circle that defines the cross-section of the cylindrical member of the hinge 102 and is parallel to the cylindrical member of the hinge 102. The hinge 102 allows the display portion 107 to rotate vertically about the longitudinal axis 104, i.e., the top of the display portion moves down, and the bottom of the display portion moves up. As illustrated, the display portion 107 is partially rotated in the clockwise direction, the directions indicated by arrow 198 and 102. However, rotation in the counter-clockwise direction is also within the scope of this disclosure. Considering rotation of the display portion 107 by 180 degrees in either direction, upon collapsing the laptop computer into its portable mode, the display portion 107 will face outward toward the user rather than inward and hidden from the user. The system 100 also comprises a cable guide 106.

Referring to FIG. 1C, an exploded perspective view of the cable guide 106 is illustrated. Preferably, the cable guide 106 comprises a physical restricting member 113 coupled to a semi-circular member 115 to form a semi-circular cylindrical tube. Referring to FIG. 1D, a front view of the cable guide 106 is illustrated. The area 105 bounded by the semi-circular cylindrical tube 115 and restricting member 113 is preferably hollow to allow room for other objects. Preferably, the longitudinal axis 104 resides inside the bounded area 105. The restricting member 113, as pictured, is curved. However, the restricting member 113 may be any shape, including flat, as long as sufficient space exists for a cable between the restricting member 113 and the hinge. In at least one embodiment the cable guide is plastic; however, other materials are within the scope of the disclosure. The cable guide 106 is preferably adapted to be removably coupled to the cylindrical member of the hinge via insertion. In at least one embodiment, the dimensions of the semicircular member 115 are preferably such that the semicircular member 115 touches the cylindrical portion of the hinge when inserted.

Referring to FIG. 1E, operation of the cable guide 106 is illustrated. As pictured, the cable guide 106 is fully inserted into the cylindrical member 110 of the hinge 102 such that the front edges of the cable guide 106 and cylindrical member 110 are flush and the outside of the semi-circular member 115 is touching the inside of the cylindrical member 110. The cable guide 106 is adapted to route one or more cables 108 through the hinge 102 offset from the longitudinal axis 104 of hinge 102, specifically the longitudinal axis 104 of the cylindrical member 110 of the hinge 102. In at least one embodiment, the cable 108 is physically restricted from occupying the longitudinal axis 104 by the restricting member 113, i.e., the cable 108 is prevented from entering the space along any point on the longitudinal axis 104.

In at least one embodiment, the cable 108 is routed parallel to the longitudinal axis 104, and the cable guide 106 extends through the length of the cylindrical member 110. In another embodiment, the cable guide 106 spans only a portion of the length of the cylindrical member 110. In yet another embodiment, a cable guide 106 appears on each end of the cylindrical member 110, the cable guides 106 routing one or more cables 108 through one or both cable guides 106. In at least one embodiment, the cable guide 106 is adapted to route the cable 108 through the hinge 102 two-and-a-half millimeters offset from the longitudinal axis 104.

Referring to FIG. 1F, a cross-section side view of the system 100 is again illustrated. The system 100, described above, further comprises a cable 108. The cable 108 enters the hinge 102 beneath the cable guide 106, which prevents the cable 108 from entering the space along the longitudinal axis 104.

The cable 108 conducts power, display information, or both, and in at least one embodiment, the cable 108 comprises a plurality of wires, e.g., 19 wires. These wires ultimately have different destinations, but are bundled together by the cable 108 for passage through the hinge 102. In at least one embodiment, the cylindrical member 110 spans the entire width of the computer. In another embodiment, the cylindrical member 110 of the hinge 102 spans only a portion of the width of the computer. Preferably, the power, display information, or both are conducted to the display portion 107, which displays the display information.

In at least one embodiment, two cables 108 conduct power, display information, or both to the display portion 107. Preferably, one cable 108 is routed by a cable guide 106 through a hinge 102 on one side of the laptop computer, while another cable 108 is routed similarly on the other side of the laptop computer.

The above discussion is meant to be illustrative of the principles and various embodiments of the present invention. Numerous variations and modifications will become apparent to those skilled in the art once the above disclosure is fully appreciated. For example, the dimensions of the various components may differ. It is intended that the following claims be interpreted to embrace all such variations and modifications.

What is claimed is:

1. A computer system, comprising:
   a base;
   a display assembly coupled to the base by a hinge, the hinge comprising a cable guide and a longitudinal axis;
   a cable providing electrical connectivity between the base and the display assembly;
   wherein the cable extends from the base, up along a side of the display assembly and into the cable guide of the hinge with the cable offset from the longitudinal axis of the hinge.

2. The system of claim 1, wherein the cable guide is adapted to restrict the cable from occupying the longitudinal axis of the hinge during hinge rotation.

3. The system of claim 1, wherein the cable guide comprises a restricting member.

4. The system of claim 3, wherein the cable guide comprises a semi-circular member coupled to the restricting member.

5. The system of claim 1, wherein the cable guide is adapted to route the cable through the hinge 2.5 millimeters offset from the longitudinal axis of the hinge.

6. The system of claim 1, wherein the cable guide is adapted to be removably inserted to the hinge.

7. An apparatus comprising:
   a conducting means for conducting power and display information from a base up along side a display means for displaying the display information;
   a rotating means for rotating about a longitudinal axis; and
   a routing means for routing the conducting means through the rotating means offset from the longitudinal axis.

8. The apparatus of claim 7, wherein the rotating means is to rotate the display means about the longitudinal axis, wherein the routing means is adapted to restrict the conducting means from occupying the longitudinal axis during rotation of the rotating means.

9. The apparatus of claim 8, wherein the routing means is removably coupled to the rotating means, and the rotating means is adapted to rotate the display means vertically about the longitudinal axis.

* * * * *